Figure 1:
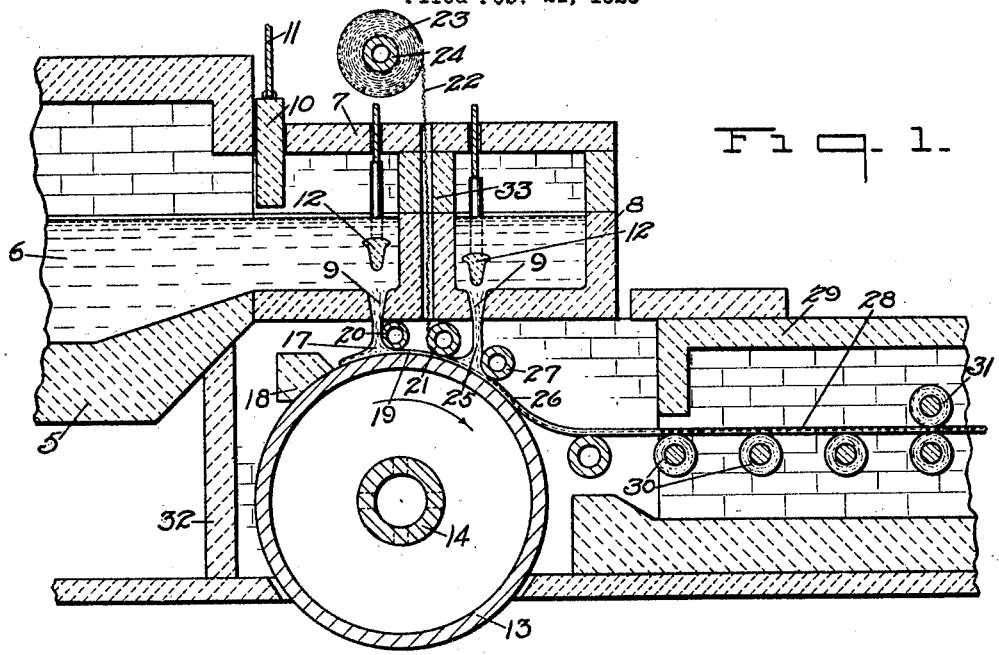

Jan. 10, 1928.  1,656,048

J. P. CROWLEY

WIRE GLASS MACHINE

Filed Feb. 21, 1925

INVENTOR.
Joseph P. Crowley.

Frank Fraser
ATTORNEY.

Patented Jan. 10, 1928.

1,656,048

UNITED STATES PATENT OFFICE.

JOSEPH P. CROWLEY, OF TOLEDO, OHIO, ASSIGNOR TO THE LIBBEY-OWENS SHEET GLASS COMPANY, OF TOLEDO, OHIO, A CORPORATION OF OHIO.

WIRE-GLASS MACHINE.

Application filed February 21, 1925. Serial No. 10,762.

The present invention relates to sheet glass apparatus, and has particular reference to an apparatus for producing a sheet having a wire mesh embedded therein.

An important object of the invention is to provide a sheet glass apparatus wherein a quantity of glass is deposited upon a rotatable drum in a manner that a sheet may be rolled therefrom, and includes means for feeding a wire fabric into said sheet.

A further object of the invention is to provide an apparatus for producing sheet glass wherein a plurality of streams of molten glass are flowed upon a rotatable drum to produce a divided sheet source, and includes means for feeding a wire fabric between the sheet source so that a sheet can be rolled from said molten glass and having wire fed therein to give a sheet of glass reinforced by a wire fabric.

Still another object of the invention is to provide an apparatus for producing sheet glass wherein a sheet is rolled from a quantity of molten glass after which a wire fabric is positioned thereon, and then a second sheet is rolled upon the first to produce an integral sheet having a reinforcing wire embedded therein.

Other objects and advantages of the invention will become apparent during the course of the following description.

In the drawings wherein like numerals are employed to designate like parts throughout the same.

Figure 2:
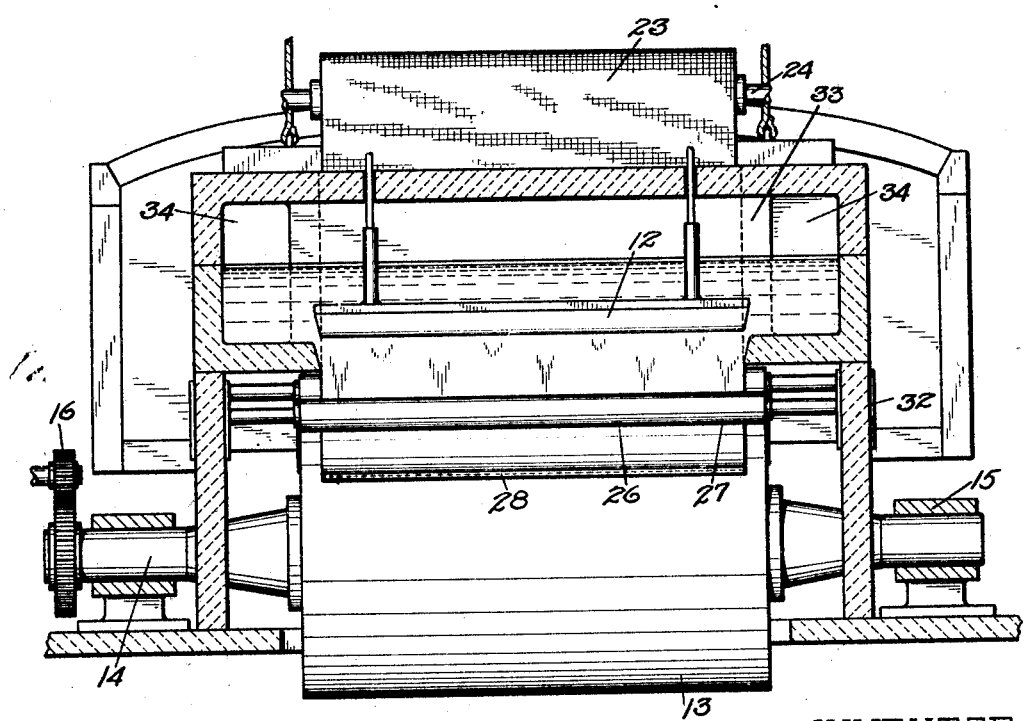

Fig. 1 is a fragmentary vertical longitudinal section through a portion of the apparatus embodying my invention, and Fig. 2 is a vertical transverse section therethrough showing my improved construction in elevation.

In the drawing wherein for the purposes of illustration is shown the preferred embodiment of the invention, the numeral 5 designates a tank furnace of any conventional type having a mass of molten glass 6 therein which is being fed toward the discharge end 7 of the tank 5. The working end 8 is provided with a plurality of discharge slots 9 which are preferably narrow elongated orifices formed in the bottom of the working end. The flow of glass toward the working end is controlled by a shear-cake or the like 10 adjustable through the means 11.

The discharge slots 9 may be of any desired shape or configuration, and are shown as being controlled by the slabs 12 which may be moved to and from the openings to control the flow of glass therethrough.

Arranged below the discharge openings 9 is a rotatable drum 13 carried by the shaft 14 which is supported in the journals 15. The shaft 14 and drum 13 are positively driven as by the mechanism 16 connected to the shaft 14. The drum is preferably formed from a non-corrosive metal alloy and is adapted to be internally cooled to prevent overheating from the molten glass which is deposited thereon during the formation of the sheet. To produce a smooth sheet the outer surface of the drum may be highly polished.

As is clearly shown in Fig. 1 the glass passing through the discharge slots 9 is received upon the outer surface of the rotatable drum 13. The stream nearest the tank 5 is deposited upon the drum near the tank thereof, and to prevent the glass mass 17 from following the direction opposite to the direction of rotation a slab 18 is provided. The drum is rotated in the direction of the arrow, and a sheet 19 is formed between the drum and roll 20. The roll 20 is adjustably mounted to determine the thickness of the sheet 19 being formed. After the sheet 19 has been rolled from the mass 17 it passes under a second roll 21 which feeds a wire mesh 22 from the source of supply 23 carried upon the shaft 24. The wire mesh or fabric 22 is pressed or rolled upon the top surface of the sheet 19, after which the sheet 19 and wire fabric 22 is passed under the second supply body 25 where a second sheet 26 is formed thereon by the third roll 27. An integral structure 28 is then drawn from the rotatable drum 13 and passed through an annealing leer 29, the said sheet being supported upon suitable rolls 30. The sheet may be pressed or rolled to a flat, smooth and uniform thickness by means of the supplementary roll 31 arranged above one of the leer rolls 30.

As is shown in Fig. 1, the drum 13 is arranged in a chamber 32 which may be heated as desired to prevent the glass discharging through the slots 9 from becoming too viscous. It is desirable that the glass remain in a plastic or semi-plastic condition until after the second sheet 26 has been formed upon the first sheet 19 and wire 22. By maintaining the glass at a plastic or semi-plastic condition it is possible to produce an integral structure of glass having a wire mesh embedded therein.

Due to the manner in which the sheet 28 is formed, namely, by rolling a sheet of glass from a source of molten glass, pressing a wire fabric thereon, and then rolling a second sheet upon the first, it is possible to produce a uniform and flat sheet of glass. The rolls 20, 21 and 27 are adjustable so that any thickness of sheet may be produced with the apparatus just described. The rolls are preferably high polished, internally cooled, metallic alloy rolls so that the surface of the sheet will not be unduly harmed by contact with the said rolls.

If it is desired to produce an opaque or ribbed wire glass, the surface of the drum 13 and roll 27 can be formed accordingly. Thus if it is desired to produce a ribbed sheet the drum and roll may be corrugated to give the desired effect.

To protect the wire fabric 22 before it is fed into the sheet it is passed through a slot 33 which is formed by refractory blocks through the working end 8. As is shown in Fig. 2, the glass passes around the structure 33, through the channels 34 at both sides thereof, thus advancing a sufficient supply of glass toward the forwardmost discharge orifice 9.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, a rotatable member, means for flowing a plurality of streams of molten glass thereon, and means for drawing a sheet therefrom.

2. In sheet glass apparatus, a rotatable member, means for flowing a plurality of streams of molten glass thereon, means for interposing a fabric between said streams, and means for drawing a sheet of glass therefrom.

3. In sheet apparatus, a rotatable member, means for flowing a plurality of streams of molten glass thereon, and means for rolling the glass into sheet form.

4. In sheet glass apparatus, a rotatable member, means for flowing a plurality of streams of molten glass thereon to form a divided sheet source, means for forming a sheet and drawing it from said rotatable member, and means for feeding a fabric between the said streams and into the sheet being formed.

5. In sheet glass apparatus, a rotatable member, means for flowing a plurality of streams of molten glass thereon, means for forming a sheet therefrom, and means for flattening said sheet.

6. In sheet glass apparatus, a rotatable member, means for flowing a plurality of streams of molten glass thereon, means for forming a sheet therefrom, and means for rolling the sheet after it has been removed from said rotatable member.

7. In sheet glass apparatus, a rotatable member, means for flowing a plurality of streams of molten glass thereon, means for forming a sheet therefrom, an annealing leer through which the sheet passes, and sheet flattening means arranged in said leer.

8. In sheet glass apparatus, a rotatable member, means for flowing a plurality of streams of molten glass thereon, means for forming a sheet therefrom, an annealing leer including supporting means for the sheet as it passes through said leer, and means cooperating with the supporting means for flattening the said sheet of glass.

9. In sheet glass apparatus, a rotatable member, means for flowing a plurality of streams of molten glass thereon, means for forming a sheet therefrom, an annealing leer for said sheet, and a pair of rolls in said leer for flattening the sheet of glass as it passes therethrough.

10. In sheet glass apparatus, a rotatable member, means for flowing a plurality of streams of molten glass thereon, means for forming a sheet therefrom, an annealing leer for said sheet, and a pair of rolls arranged in the hot end of said leer for flattening the sheet of glass as it passes therethrough.

11. In sheet glass apparatus, a rotatable member, means for flowing a plurality of streams of molten glass thereon, and a plurality of rotatable means associated with said rotatable member for reducing the streams of glass to sheet form.

Signed at Toledo, in the county of Lucas and State of Ohio, this 18th day of February, 1925.

JOSEPH P. CROWLEY.